No. 877,390. PATENTED JAN. 21, 1908.
H. V. WILLE.
BOLT.
APPLICATION FILED MAR. 12, 1907.
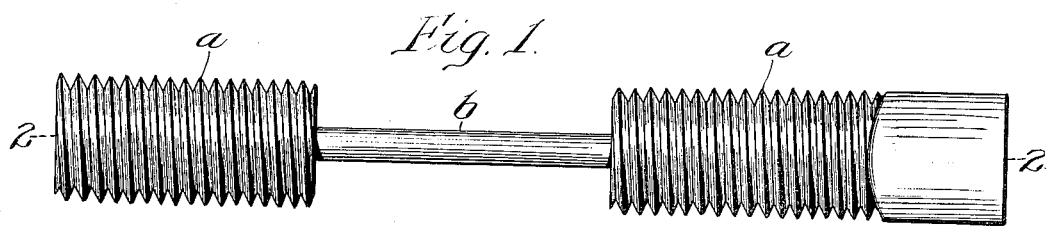
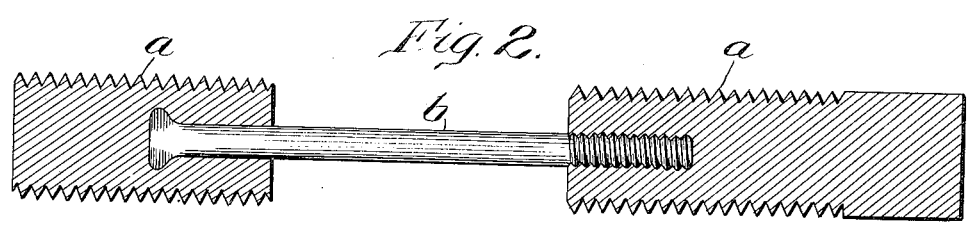
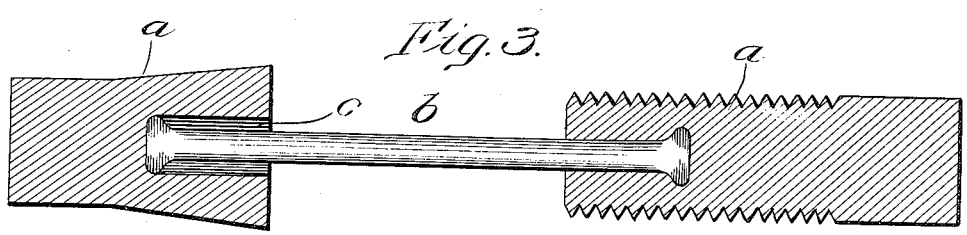
INVENTOR
Henry V. Wille
WITNESSES
BY
ATTORNEY

UNITED STATES PATENT OFFICE.

HENRY V. WILLE, OF PHILADELPHIA, PENNSYLVANIA.

BOLT.

No. 877,390.

Specification of Letters Patent.

Patented Jan. 21, 1908.

Application filed March 12, 1907. Serial No. 361,936.

*To all whom it may concern:*

Be it known that I, HENRY V. WILLE, a citizen of the United States, and a resident of the city and county of Philadelphia, State of Pennsylvania, have invented certain new and useful Improvements in Bolts, of which the following is a specification.

My invention relates to improvements in bolts and more particularly to improvements in stay bolts for locomotive boilers and the object of my invention is to furnish a stay bolt which will not only have sufficient strength to withstand the longitudinal strains to which such bolts are subjected but which will also have sufficient elasticity to accommodate itself to the lateral or bending or vibratory strains, which almost invariably cause such bolts to break.

Stay bolts, in locomotive boilers particularly, give a great deal of trouble by breaking, the cause being not only the severe strains that are incidental to the particular use of the boiler but to a great extent owing to the unequal expansion between the fire box, to which one of the ends of the bolts are secured, and the outer shell of the boiler, to which the other ends of the bolts are secured; the fire box being subject to great and varying degrees of heat and the outer shell remaining at practically an even temperature, the result being that the bolt is constantly subjected to bending or vibratory strains that presently cause it to break.

In my improved bolt the ends, which are threaded so as to be screwed one into the fire box and the other into the outer shell of the boiler, are made of soft metal so that after being screwed in place they may be headed or riveted over so as to securely fasten them, and the central portion, or stem, is made of a piece of metal of high tensile strength which will be sufficiently strong to stand any tensile strains that may be placed upon it and which will be at the same time sufficiently elastic to bend without danger of breaking under the strains caused by unequal expansion of the parts to which its ends are secured.

In the accompanying drawings forming part of this specification and in which similar letters of reference indicate similar parts throughout the several views:—

Figure 1, is a side elevation of a stay bolt of my improved construction; Fig. 2, a section of Fig. 1 on line 2—2; Fig. 3, a section similar to that shown in Fig. 2, before one of the ends of the bolt is closed down on the stem; Fig. 4, a side elevation of a stem, one of the upset ends being threaded on the head; and Fig. 5, an end elevation of the right handed end of Fig. 4.

$a$—$a$ are the ends of the stay bolt which are made of soft metal preferably so that they may be headed over after having them screwed into place. If the fire box be of copper I would preferably construct the head which is secured to this part of similar metal or of one of the alloys of copper suitable for the purpose.

$b$ is the stem of the bolt which is preferably made of a steel having a high tensile strength, and is preferably tempered either before or after being fixed in the soft ends. It is well known that with equal lengths the flexibility increases in an inverse ratio to the diameter, the life of the bolt, therefore, will be greatly increased by having the diameter as small as possible. Provided, however, that the tensile strength is sufficient to meet the requirements of practice, and it is to enable the use of a small diameter that a high tensile steel is used and that it is preferably tempered. The stem being of small diameter will also be beneficial to the sheets of the firebox as it will interpose a smaller obstruction to the circulation of the water in the boiler. The ends of the stem $b$ are secured to the ends $a$ of the bolt in any suitable manner, by welding, by shrinking, by brazing, or by screwing them in, for instance. In Fig. 2, one end of the bolt is shown secured to one end $a$ by welding while the other end is shown secured by screw threads.

The bolt may be made of one piece of metal which is susceptible of being treated so as to form ends sufficiently soft to thread and to hammer over while leaving the stem of high tensile strength. The ends $a$ of the bolt need not necessarily be rigidly attached to the stem but a rigid attachment would probably be better as any loose attachment would, if the bolts be used as stay bolts for boilers, shortly be rendered inoperative by corrosion or incrustation. I prefer for boiler stay bolts to make the stem of a diameter considerably less than the ends. A stem of a metal of high tensile strength of three-eighths inch diameter I have found amply large for this purpose as it has sufficient strength and great flexibility, permits the use of heads of correspondingly small diameter which is of advantage in that but comparatively small holes are required in the fire box and boiler shell to receive them, and offers less obstruction to the circulation of water in the space between the boiler shell and fire box.

I do not desire to confine myself to any particular use for my improved bolt for while I have in mind using it particularly for stay bolts for boilers it will be obvious that it may be used for many other purposes.

In the drawings I have shown both ends of the bolt furnished with soft metal ends, it will be understood, however, that but one end of the bolt may be so ended without departing from the spirit of my invention.

Having thus described my invention, I claim as new and desire to secure by Letters Patent:—

1. As a new article of manufacture, a bolt having a soft metal end and a stem of metal of high tensile strength.
2. As a new article of manufacture, a bolt having a soft metal end and a flexible stem of metal of high tensile strength.
3. A bolt having an exteriorly threaded soft metal end and a stem of metal of high tensile strength.
4. A bolt having an exteriorly threaded soft metal end and a flexible stem of metal of high tensile strength.
5. A bolt having an exteriorly threaded soft metal end and a flexible stem of tempered or treated steel of high tensile strength.
6. A bolt having an exteriorly threaded soft metal end and a stem of metal of high tensile strength, said stem being of relatively smaller diameter than said end.
7. A bolt having an end of soft metal and a stem of metal of high tensile strength, said end being secured to said stem.
8. A bolt having an end of soft metal and a flexible stem of metal of high tensile strength the end of said stem being enlarged and secured to said end.
9. A bolt having an exteriorly threaded soft metal end containing a threaded cavity or hole and a stem of high tensile strength with threaded end screwed into said cavity or hole.
10. A bolt having an exteriorly threaded soft metal end containing a cavity or hole and a stem of high tensile strength, the end of said stem being enlarged and threaded and screwed into said cavity or hole.

HENRY V. WILLE.

Witnesses:
CHARLES A. RUTTER,
F. L. MOISTER.